United States Patent
Tanaka et al.

[11] Patent Number: 5,803,995
[45] Date of Patent: *Sep. 8, 1998

[54] CALCIUM-ALUMINUM SYSTEM HYDROGEN ABSORBING ALLOY

[75] Inventors: Hideaki Tanaka; Hiroshi Miyamura; Nobuhiro Kuriyama; Tetsuo Sakai; Itsuki Uehara, all of Ikeda, Japan

[73] Assignee: Agency of Industrial Science and Technology, Tokyo, Japan

[*] Notice: The term of this patent shall not extend beyond the expiration date of Pat. No. 5,656,105.

[21] Appl. No.: 797,897

[22] Filed: Feb. 10, 1997

Related U.S. Application Data

[63] Continuation of Ser. No. 495,744, Jun. 27, 1995, Pat. No. 5,656,105.

[30] Foreign Application Priority Data

Jun. 28, 1994 [JP] Japan .................................... 6-170290

[51] Int. Cl.$^6$ .................................................... C22C 21/00
[52] U.S. Cl. ........................... 148/437; 148/440; 420/542; 420/549; 420/900
[58] Field of Search ..................................... 148/437, 440; 420/407, 415, 592, 547, 549, 900

[56] References Cited

U.S. PATENT DOCUMENTS

| | | | |
|---|---|---|---|
| 4,956,009 | 9/1990 | Robison | 420/415 |
| 5,501,917 | 3/1996 | Hong | 420/400 |
| 5,656,105 | 8/1997 | Tanaka et al. | 420/900 |

FOREIGN PATENT DOCUMENTS 007840  2/1980  European Pat. Off. ............... 420/900

*Primary Examiner*—George Wyszomierski
*Attorney, Agent, or Firm*—Nikaido Marmelstein Murray & Oram, LLP

[57] ABSTRACT

The calcium-aluminum system hydrogen absorbing alloy of the present invention is an alloy which is composed of a mixture P of Ca with Mg and an Al base alloy Q, has a molar ratio P:Q of 1:1.5 to 2.8 and shows a Laves phase with the C15-type structure as the fundamental structure thereof.

1 Claim, 6 Drawing Sheets

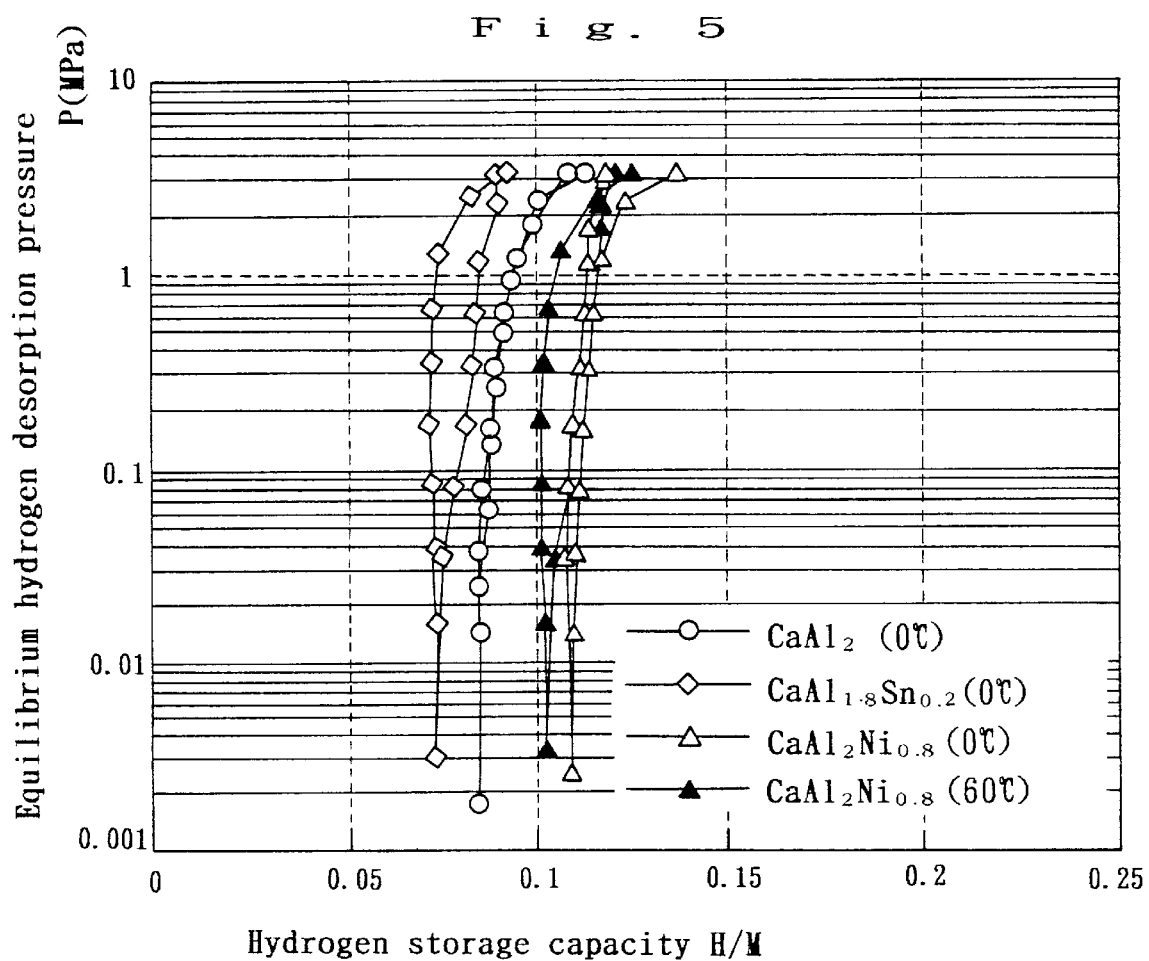

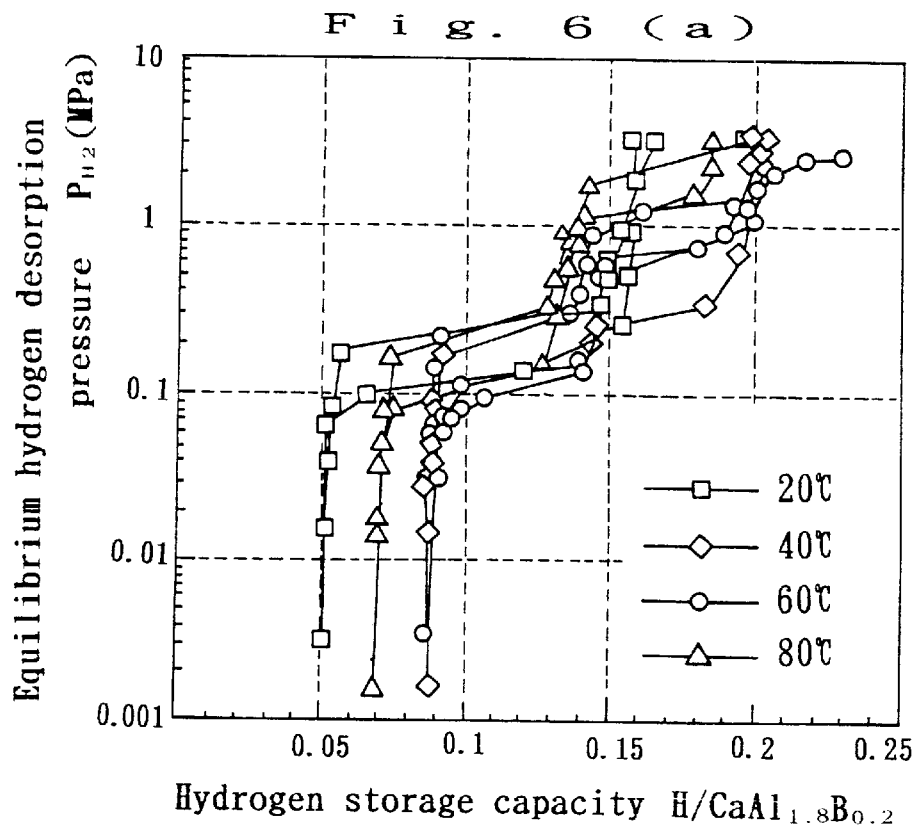
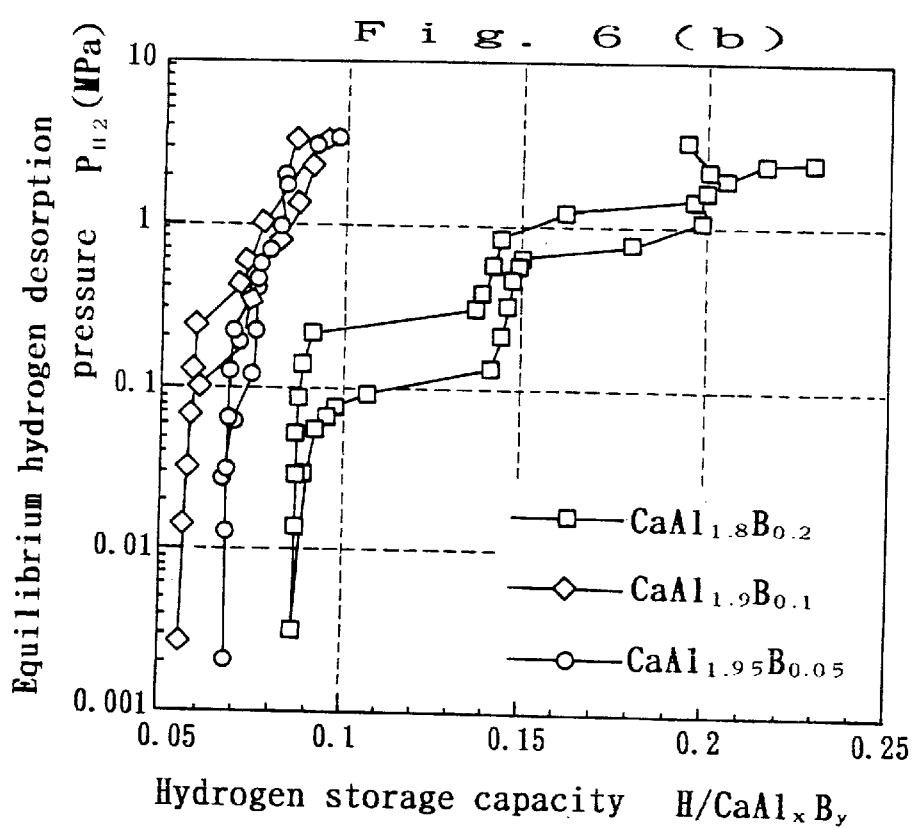

# CALCIUM-ALUMINUM SYSTEM HYDROGEN ABSORBING ALLOY

This is a continuation of application Ser. No. 08/495,744 filed Jun. 27, 1995, now U.S. Pat. No. 5,656,105.

BACKGROUND

This invention relates to calcium-aluminum system hydrogen absorbing alloys.

Hydrogen absorbing alloys are characterized by reacting directly with hydrogen and thus quickly absorbing a large amount of hydrogen, while desorbing the hydrogen thus absorbed. Accordingly, they enable reversible absorption and desorption of hydrogen. Thus there have been actively made developments regarding techniques in the use of these hydrogen absorbing alloys mainly in the field of energetic technology. Hydrogen absorbing alloys are being applied to various purposes including the storage and transport of hydrogen, energy conversion media and negative electrodes for some secondary batteries.

In order to put a hydrogen absorbing alloy into practical use, it is generally necessary that the hydrogen absorbing alloy satisfy the following requirements.

(1) Having such a hydrogen absorption pressure and a hydrogen dissociation pressure as to facilitate handling within the operating temperature range.

(2) Showing high rates of hydrogen sorption within the operating temperature range.

(3) Having a large chargeable hydrogen capacity within the operating temperature range and under such a pressure as to facilitate handling.

(4) Being easily activated during initial hydriding.

(5) Showing a small difference between hydrogen pressures required for hydrogen absorption and hydrogen desorption (i.e., hysteresis).

(6) Being highly durable when subjected to repeated absorption and desorption over a long period of time.

(7) The cost of materials being low.

(8) The alloy per se being not heavy.

Regarding these points, there have been publicly known Laves phase hydrogen absorbing alloys with the C15-type structure such as group IVa metal-3d transition metal system alloys (Ti—Cr system, Zr—V system, Zr—Mn system, etc.) and rare earth metal-3d transition metal system alloys [La—Ni system, Mm (misch metal)-Ni system, etc.].

On the other hand, publicly known hydrogen absorbing alloys containing Ca as the main component are exemplified by Ca—Ni system and Mg—Ca system alloys. Although the Ca—Ni system alloy has a large hydrogen storage capacity and can easily undergo the initial activation, it requires a large amount of Ni which is an expensive and heavy element. Although the Mg—Ca system alloy is a light one, it has not been put into practical use because it suffers from some problems, i.e., (a) requiring prolonged initial activation at a high temperature; (b) having a low equilibrium hydrogen dissociation pressure at ordinary temperatures; and (c) being poor in oxidation resistance.

Therefore attempts have been made to impart the characteristics (1) to (8) as described above to a hydrogen absorbing alloy or to improve these characteristics to thereby give a hydrogen absorbing alloy having an improved practical availability by, for example, making the composition ratio of a hydrogen absorbing alloy (mainly the above-mentioned Laves phase hydrogen absorbing alloy or one containing Ca as the main component) nonstoichiometric or making multi-components. In the case of Ca—Ni system or Mg—Ca system alloys, for example, attempts have been made to replace some part of the alkaline-earth metal with a rare earth element or to replace some part of Ni with other transition elements, etc.

When used in products such as negative electrodes of nickel-metal hydride (Ni—MH) secondary batteries or fuel cells, however, these alloys are undesirable from the viewpoints of lightness and cheapness. Thus they leave much room for improvement regarding these points.

SUMMARY

Accordingly, it is a primary object of the present invention to provide a hydrogen absorbing alloy which has practically usable hydrogen sorption characteristics and is excellent in lightness and cheapness.

In order to achieve the above-mentioned object, the present inventors have conducted extensive studies. As a result, they have successfully found that Laves phase alloys with the C15-type structure, which are composed of a Ca base material and an Al base alloy at a specific molar ratio, have practically usable hydrogen sorption characteristics and are highly advantageous from the viewpoints of lightness and cheapness. The present invention has been completed based on this finding.

Thus, the gist of the present invention resides in a calcium-aluminum system hydrogen absorbing alloy, which is an alloy composed of a mixture P of Ca with Mg and an Al base alloy Q, characterized in that the molar ratio P:Q is 1:1.5 to 2.8 and it is fundamentally Laves phase with the C15-type structure.

THE DRAWINGS

FIG. 2(a) is a diagram showing differential thermal analysis curves of powdery alloys $Ca_{1-\alpha}Mg_{\alpha}(Al_{1-\beta}M_{\beta})_2$, while

FIG. 5 is a diagram showing the hydrogen pressure-composition-temperature (p-c-T) characteristic curves of Ca—Al(—M) system alloys; and FIG. 6(a) is a diagram showing the p-c-T curves of an alloy $CaAl_{1.8}B_{0.2}$ at 0° to 60° C., while FIG. 6(b) is a diagram showing the p-c-T curves at 60° C. formed by using γ as a parameter against $Ca(Al_{1-\gamma}B_{\gamma})_2$.

THE PREFERRED EMBODIMENTS

Figure 1A:
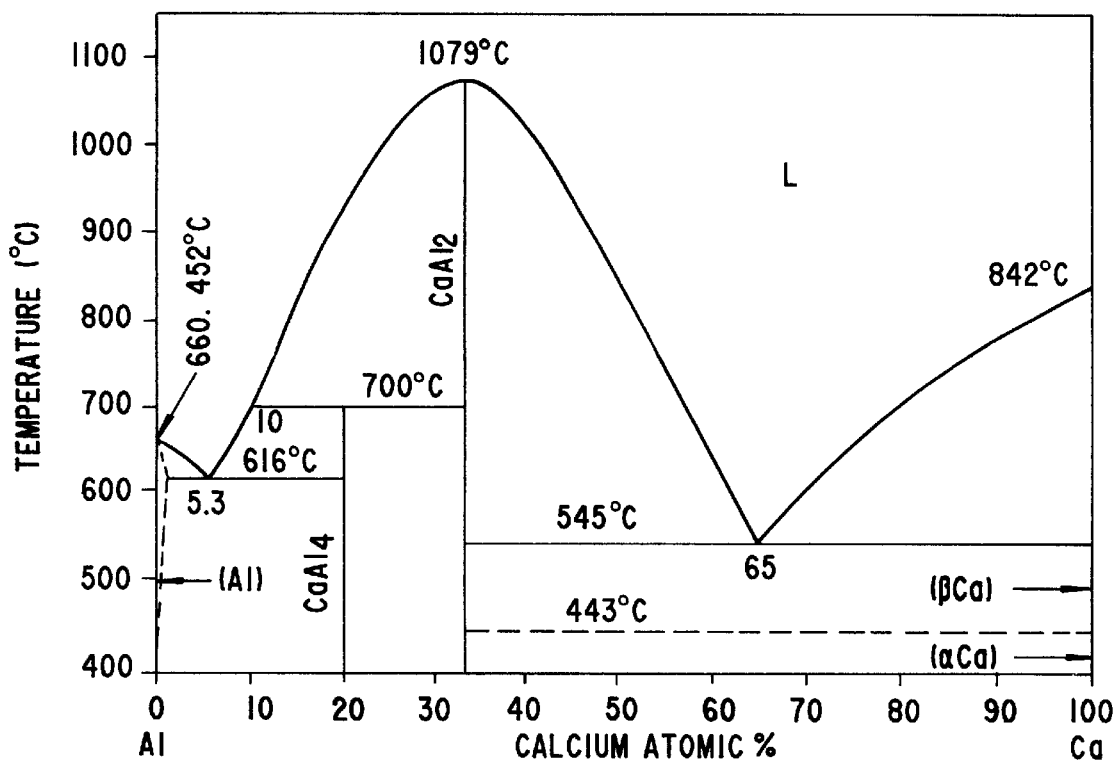
FIG. 1(a) is a calcium-aluminum system binary phase diagram, while FIG. 1 (b) is an aluminum-boron system binary phase diagram.
Figure 1B:
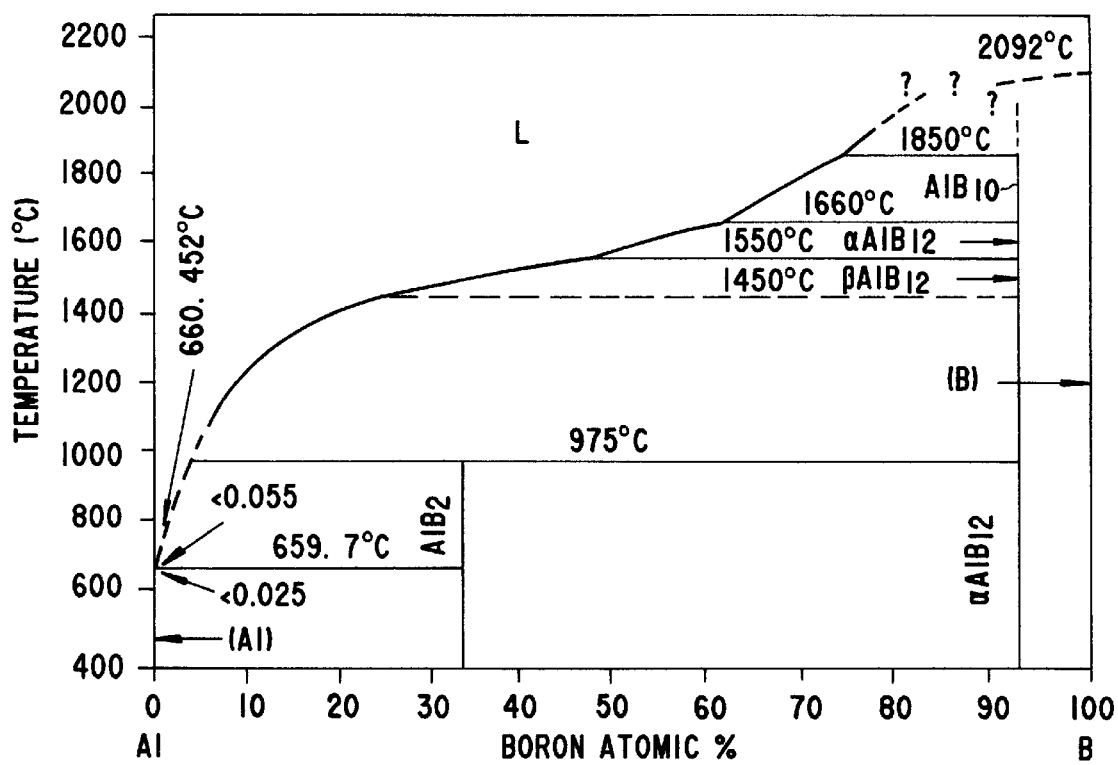

In the hydrogen absorbing alloy of the present invention, the molar ratio of the mixture P to the aluminum base alloy Q (P:Q) usually falls within a range of 1:1.5 to 2.8. It is not preferable that the molar ratio is outside the range as specified above, since the hydrogen storage capacity is largely reduced and thus the hydrogen absorbing alloy fails to fully exert its function in such a case. The hydrogen absorbing alloy of the present invention has the Laves phase with the C15-type structure as its fundamental structure. It is desirable that the Laves phase with the C15-type structure amounts at least to 70% by volume in the alloy. It is not preferable that the proportion of the Laves phase with the C15-type structure is lowered (i.e., structures with different phases are deposited in a large amount). This is because the crystallinity of the Laves phase with the C15-type structure is relatively deteriorated and thus the hydrogen storage capacity of the alloy is lowered in this case.

In the above-mentioned mixture P, some part of Ca has been replaced with Mg. The replacement with Mg is particularly effective in lightening the alloy. From this point of view, it is preferable that the mixture P is one represented by the general formula $(1-\alpha)Ca+60$ Mg (wherein $0<\alpha \leq 0.2$). It is not preferable that a exceed 0.2, since there is a risk that an alloy of constant qualities cannot be produced at a high reproducibility or the Laves phase with the C15-type structure cannot be achieved while structures with different phases are deposited in an elevated amount in such a case. A smaller value of $\alpha$ results in a lower contribution to the lightening of the alloy. In the case where the lightness of the alloy is not particularly required, however, the value $\alpha$ may be an extremely small one or even 0 (i.e., Ca is used alone).

The alloy composition of the aluminum base alloy Q may be arbitrarily selected depending on, for example, the composition of the above-mentioned mixture P and the purpose of the utilization of the hydrogen absorbing alloy. In usual cases, it is preferable to use one represented by the general formula $Al_{1-\beta}M_\beta$ (wherein $0<\beta \leq 0.3$, the element M means at least one element selected from among boron, carbon, silicon, germanium, tin, lead, titanium, vanadium, chromium, manganese, iron, cobalt, nickel, copper and zinc). It is not preferable that $\beta$ exceed 0.3. This is because, in such a case, an element having a high melting point is not molten but remains as such and thus there is a risk that an alloy of constant qualities cannot be produced at a high reproducibility or the Laves phase with the C15-type structure cannot be achieved while structures with different phases are deposited in an elevated amount. The value $\beta$ may be an extremely small one or even 0 (i.e., Al is used alone), so long as the homogenization of the molten solution in the preparation of the alloy and the improvement in the hydrogen absorption characteristics of the resulting alloy are not deteriorated thereby.

In the present invention, use can be made of an alloy represented by the general formula $Al_{1-\gamma}B_\gamma$ (wherein $0<\gamma \leq 0.5$) as the aluminum base alloy Q. That is to say, an improved lightness can be imparted to the alloy by replacing some part of aluminum with boron. It is not preferable that $\gamma$ exceed 0.5. This is because, in such a case, the reproducibility of the alloy is lowered and crystals of structures with different phases are deposited in a large amount, like in the above-mentioned case.

The calcium-aluminum system hydrogen absorbing alloy of the present invention may be produced in the same manner as the publicly known method for producing a hydrogen absorbing alloy with the use of starting materials which have been prepared in the composition as described above. In the case of a calcium-aluminum system hydrogen absorbing alloy wherein a single phase can be hardly formed merely by directly effecting radio-frequency induced melting, the alloy of the present invention having the desired hydrogen absorption characteristics can be easily obtained by preliminarily preparing an alloy with partial substitution of aluminum by an arc melting method as an initial step or preliminarily substituting some part of calcium with magnesium.

When aluminum is substituted with boron, for example, a binary alloy $Al_{1-\gamma}B_\gamma$ having a melting point of about 660° to 1,500° C. is obtained [FIGS. 1(a) and (b)]. It is often effective to synthesize $Al_{1-\gamma}B_\gamma$ before forming $CaAl_2$ system alloy because of the following. When the raw materials(Ca and Al) are heated up, pure Al with the low melting point is melted first, because raw aluminum has a lower melting point than calcium. When the materials are further heated up, calcium with high melting point and vapor pressure begins bumping, then gaseous calcium often blows off surrounding melting Al. Thus the formation of homogenous alloy with the prepared composition is sometimes prevented. However, by using the $Al_{1-\gamma}B_\gamma$ alloy with higher melting point than Ca instead of only Al, Ca seldom bumps explosively (in our experience). In this case, B causes segregation in $CaAl_2$ or forms a solid solution with the matrix $CaAl_2$ as a substitutional or interstitial atom, which contributes also to the improvement in the hydriding properties of the alloy.

EXAMPLES

To further clarify the characteristics of the present invention, the following Examples will be given. In these Examples, analyses were carried out each in the following manner.

(1) Differential thermal analysis (DTA):

Use was made of about 20 mg of each alloy powder and the analysis was effected in a hydrogen gas ($H_2$) atmosphere of 5 MPa within a temperature range of from ordinary temperature to 500° C. A comparison among the X-ray diffraction patterns obtained at the temperatures (A), (B) and (C) in FIG. 2(a) indicates that the peak in the lower temperature region (at around 330° C.) shows a primary hydrogenation of the alloy, while the one in the higher temperature region (at around 430° C.) shows further hydrogenation of the formed hydride.

(2) X-ray powder diffractometry (XRD):

Use was made of the θ–2θ method. It has been thus confirmed that the alloy of the present invention fundamentally has the Laves phase with the C15-type structure.

(3) Determination of p-c-T (hydrogen pressure-composition-temperature) characteristics:

By using an automated Sieverts'-type apparatus, about 300 mg of an alloy powder was sealed in a stainless reaction vessel and activated followed by the determination in a hydrogen atmosphere within a range of from 1 kPa to 3.3 MPa. The initial activation was carried out in the following manner by reference to the results of the differential thermal analysis. Namely, the sample was heated up to 350° C. After evacuation(by a rotary pump), $H_2$ of 3.5 MPa was introduced thereinto. The sample was exposed to hydrogen at this pressure for 150 minutes and then cooled to room temperature to thereby allow the alloy to absorb $H_2$.

Example 1

Commercially available Ca and Al were weighed to give a molar ratio of Ca:Al of 1:2 and were melted to thereby give an alloy $CaAl_2$. The sample thus obtained was subjected to DTA, XRD and the determination of the p-c-T characteristics. The results are given in Table 1, FIGS. 2(a) and (b), FIG. 3 and FIG. 5. The $CaAl_2$ thus prepared had the Laves phase with the C15-type structure with a lattice constant (a) of 0.80793 (nm).

TABLE 1

| Chemical formula of alloy | Molecular weight | H/M |
| --- | --- | --- |
| $CaAl_{1.8}B_{0.2}$ | 90.809 | 0.24 (60° C.) |
| $LaNi_5$ | 432.46 | 1.00 (20° C.) |
| TiFe | 103.747 | 0.95 (40° C.) |
| $TiMn_{1.5}$ | 130.307 | 0.96 (20° C.) |
| $CaNi_5$ | 333.63 | 0.67 (30° C.) |
| $CaMg_2$ | 88.704 | 1.24 (320° C.) |
| $Mg_2Ni$ | 107.334 | 1.33 (250° C.) |

Note: a comparison of publicly known hydrogen absorbing alloys with the one of the present invention.

Example 2

Al and Ni or Sn employed as a substituent for Al (hereinafter referred to as M) were weighed to give a molar ratio of Al:M of $(1-\beta):\beta$ and melted to thereby give an alloy $Al_{1-\beta}M_\beta$ (alloy A). This alloy A and Ca were weighed to give a molar ratio of Ca:alloy A of 1:$\delta$ ($1.5 \leq \delta \leq 2.8$) and melted again to give two alloys $Ca(Al_{1-\beta}M_\beta)_\delta$, i.e., $CaAl_2Ni_{0.8}$ and $CaAl_{1.8}Sn_{0.2}$. These samples were evaluated in the same manner as the one of Example 1. FIG. 5 shows the p-c-T characteristics of $CaAl_{1.8}Sn_{0.2}$, $CaAl_2Ni_{0.8}$ and $CaAl_{1.8}Ni_{0.2}$.

In FIGS. 5 and 6, the abscissa refers to the hydrogen storage capacity H/M, while the ordinate refers to the equilibrium hydrogen dissociation pressure P (MPa).

The term "hydrogen storage capacity H/M" as used herein refers to the ratio of the hydrogen atom number H to the atom number M of the alloy-constituting metal.

Example 3

Figure 2A:
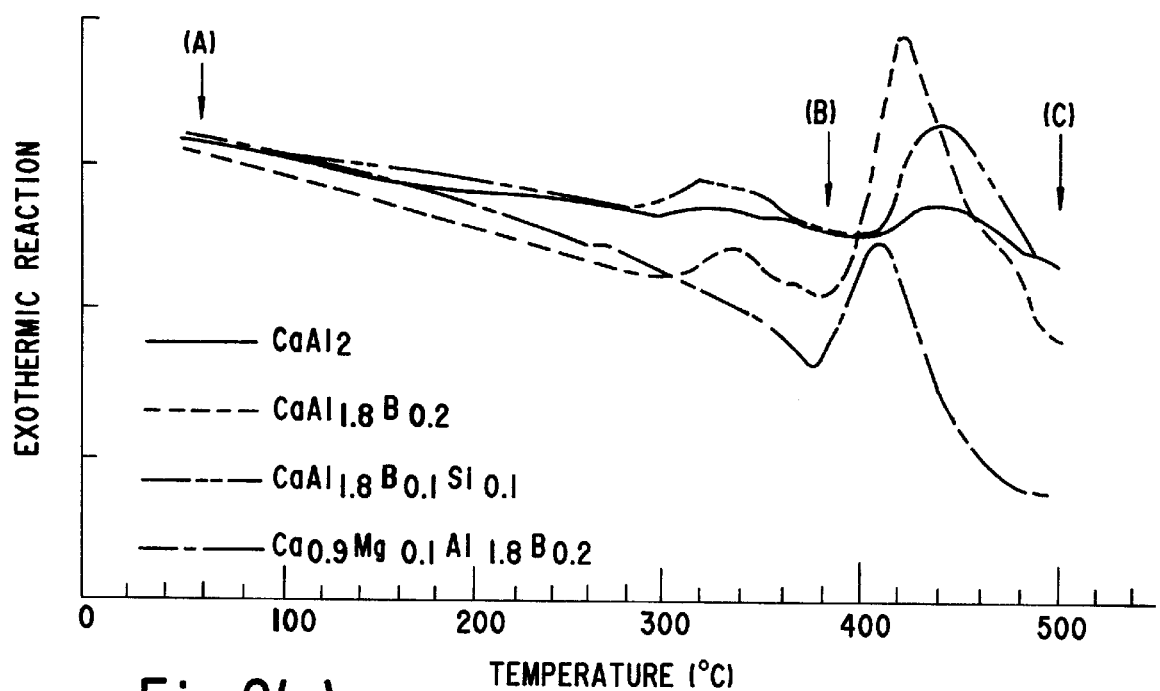
Figure 3:
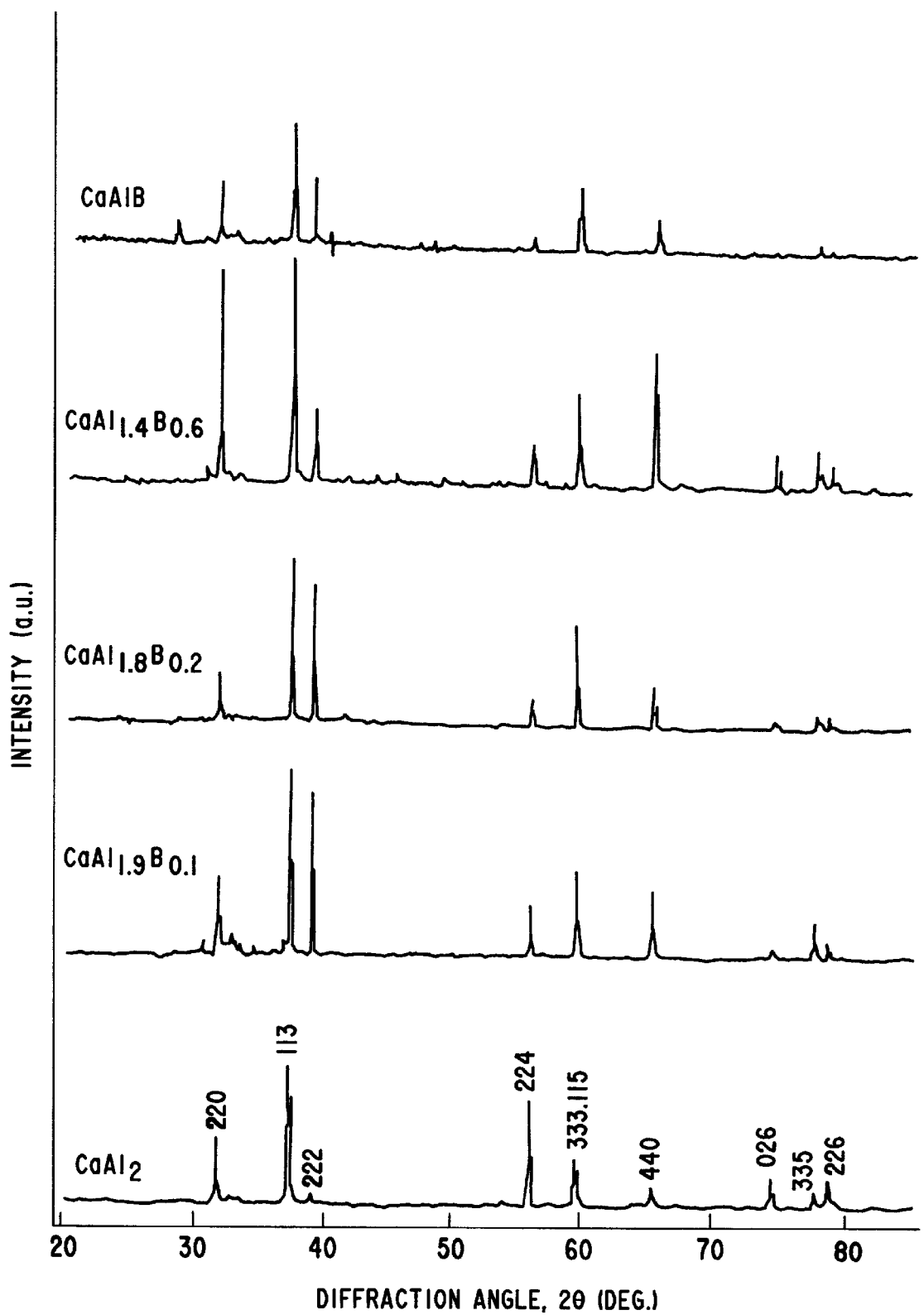
FIG. 3 shows the X-ray diffraction patterns of each calcium-aluminum system hydrogen absorbing alloys, $Ca(Al_{1-\gamma}B_{\gamma})_2$, of the present invention.

Al and B employed as a substituent for Al were weighed to give a molar ratio of Al:B of $(1-\gamma):\gamma$. Then the procedure of Example 2 was repeated to thereby give alloys $Ca(Al_{1-\gamma}B_\gamma)_2$, i.e., $CaAl_{1.4}B_{0.6}$, $CaAl_{1.8}B_{0.2}$ and $CaAl_{1.9}B_{0.1}$. These samples were evaluated in the same manner as the one of Example 1. The results of XRD and the determination of the p-c-T characteristics of $CaAl_{1.8}B_{0.2}$ and $CaAl_{1.9}B_{0.1}$ are shown in Tables 1 and 2, FIG. 3 and FIGS. 6 (a) and (b). The results of DTA of $CaAl_{1.6}B_{0.2}$ are shown in FIG. 2(a).

Example 4

Figure 2B:
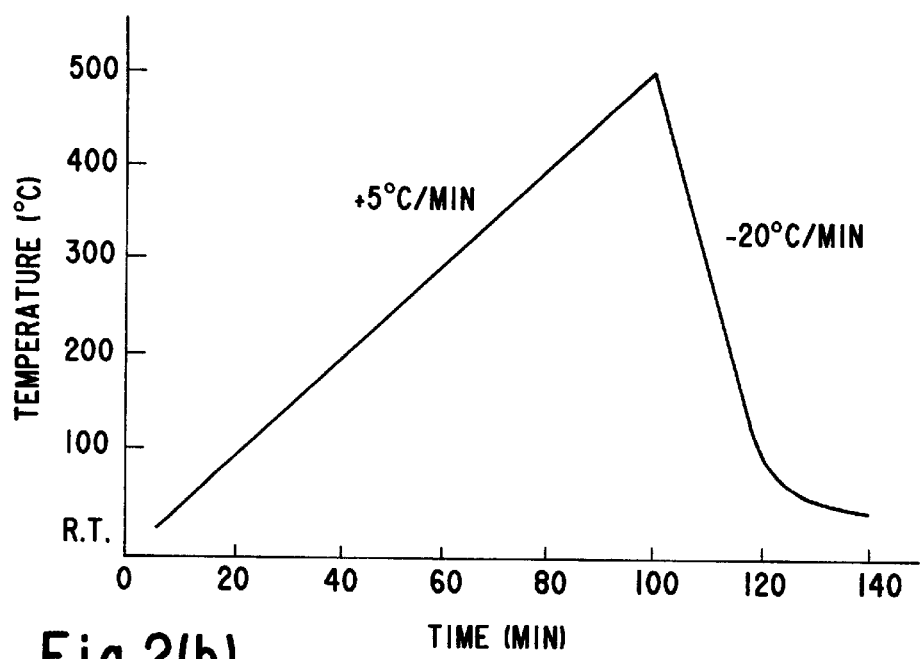
FIG. 2(b) is a diagram showing the heat history of these powdery alloys during the measurement.
Figure 4:
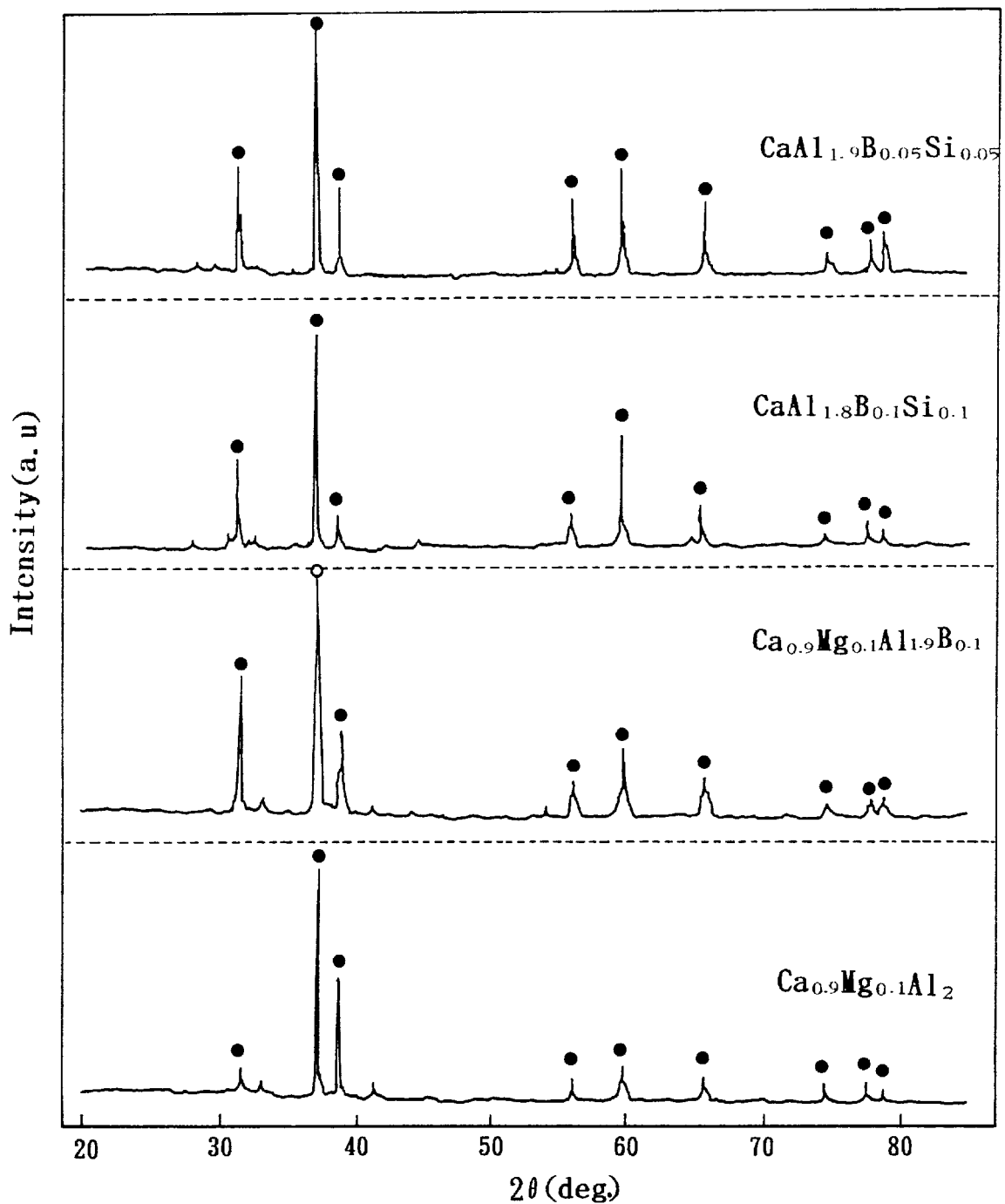
FIG. 4 shows the X-ray diffraction patterns of each calcium-aluminum system hydrogen absorbing alloys, $Ca_{1-\alpha}Mg_{\alpha}(Al_{1-\beta}M_{\beta})_2$ of the present invention.

Al and B employed as a substituent for Al were weighed to give a molar ratio of Al:B of $(1-\gamma):\gamma$ and melted to thereby give an alloy. Next, Ca and Mg were weighed to give a molar ratio of Ca:Mg of $(1-\alpha):\alpha$ and the mixed metal pieces and the above-mentioned alloy $Al_{1-\gamma}B_\gamma$ (alloy D) were weighed to give a molar ratio of (Ca+Mg):alloy D of 1:2. Then the procedure of Example 1 was repeated to thereby give alloys $Ca_{1-\alpha}Mg_\alpha(Al_{1-\gamma}B_\gamma)_2$, i.e., $Ca_{0.9}Mg_{0.1}Al_{1.9}B_{0.1}$ and $Ca_{0.9}Mg_{0.1}Al_{1.8}B_{0.2}$. These samples were evaluated in the same manner as the one of Example 1. The results of XRD and the determination of the p-c-T characteristics of $Ca_{0.9}Mg_{0.1}Al_{1.9}B_{0.1}$ are shown in FIG. 4 and Table 2. The results of DTA of $Ca_{0.9}Mg_{0.1}Al_{1.8}B_{0.2}$ are shown in FIGS. 2 (a) and (b).

Example 5

Al and B and Si, each employed as a substituent for Al, were weighed to give a molar ratio of Al:B:Si of $(1-\epsilon-\zeta):\epsilon:\zeta$ (wherein $0 \leq (\epsilon+\zeta) \leq 0.3$) and melted to thereby give an alloy. Next, the resulting alloy $Al_{1-\epsilon-\zeta}B_\epsilon Si_\zeta$ (alloy E) and Ca were weighed to give a molar ratio of Ca:alloy E of 1:2. Then the procedure of Example 1 was repeated to thereby give $Ca(Al_{1-\epsilon-\zeta}B_\epsilon Si_\zeta)_2$ alloys, i.e., $CaAl_{1.8}B_{0.1}Si_{0.1}$ and $CaAl_{1.9}B_{0.05}Si_{0.05}$. These samples were evaluated in the same manner as the one of Example 1. The results of XRD of $CaAl_{1.8}B_{0.1}Si_{0.1}$ and $CaAl_{1.9}B_{0.05}Si_{0.05}$ are shown in FIG. 4. The results of DTA of $CaAl_{1.8}B_{0.1}Si_{0.1}$ are shown in FIGS. 2(a) and (b).

As described above, the calcium-aluminum system hydrogen absorbing alloy of the present invention, which is composed of a Ca base material and an Al base alloy at a specific molar ratio and has a Laves phase with the C15-type structure, has practically usable hydrogen absorption characteristics and is excellent in lightness and cheapness. More particularly speaking, the following effects can be achieved thereby.

(1) Because it comprises light metal elements such as Ca and Al as the main materials, the calcium-aluminum system hydrogen absorbing alloy of the present invention has a lower molecular weight than others (see, for example, Table 1). Namely, the alloy per se is a light one compared with the conventional hydrogen absorbing alloys.

TABLE 2

| Ex. no. | Chemical formula of alloy | Hydrogen storage capacity (M/M) | Equilibrium hydrogen dissociation pressure (MPa) |
| --- | --- | --- | --- |
| 1 | $CaAl_2$ | 0.09 | 0.11 (0° C.) |
| 2 | $CaAl_{1.8}Sn_{0.2}$ | 0.12 | 0.05 (0° C.) |
| 3 | $CaAl_{1.8}B_{0.2}$ | 0.24 | 0.10 (60° C.) |
|   | $CaAl_{1.4}B_{0.6}$ | 0.19 | 0.09 (60° C.) |
| 4 | $Ca_{0.9}Mg_{0.1}Al_{1.9}B_{0.1}$ | 0.21 | 0.13 (60° C.) |
| 5 | $CaAl_{1.8}B_{0.1}Si_{0.1}$ | 0.25 | 0.10 (60° C.) |
|   | $CaAl_{1.9}B_{0.05}Si_{0.05}$ | 0.12 | 0.13 (60° C.) |

Note: hydrogen absorption characteristics of the alloy $Ca_{1-\alpha}Mg_\alpha(Al_{1-\beta M\beta})_\alpha$ of each Example.

(2) The calcium-aluminum system hydrogen absorbing alloys of the present invention enable reversible absorption and desorption of hydrogen at ordinary temperatures under relatively ordinary hydrogen pressures.

(3) As Table 3 shows, the raw materials for the alloy (Ca, Al, etc.) occur in a large amount as natural resources and can be supplied at a low price, which makes the calcium-aluminum system hydrogen absorbing alloy highly advantageous from the viewpoint of cost. Moreover, the cost of the calcium-aluminum system hydrogen absorbing alloy of the present invention can be further cut down via mass production. That is to say, it is suitable for the production on an industrial scale.

TABLE 3

| Element | Atomic weight | Occurrence (g/ton) | Price (yen/kg) | Price ($10^3$ yen/mol) |
| --- | --- | --- | --- | --- |
| Ca | 40.08 | 36,300 | 1,500 | 60.1 |
| Al | 26.982 | 81,300 | 170 | 4.6 |
| B | 10.82 | 3 | 9,500 | 102.8 |
| Mg | 24.32 | 20,900 | 550 | 13.4 |
| Ti | 47.90 | 4,400 | 1,100 | 52.6 |
| Fe | 55.847 | 50,000 | 50 | 2.8 |
| Ni | 58.71 | 80 | 900 | 52.8 |
| Zr | 91.22 | 220 | 7,000 | 638.5 |
| La | 138.91 | 18.5 | 23,300 | 3,236.6 |

Note: major raw materials of hydrogen absorbing alloy and occurrence and price thereof. [Reference: the Latest Periodic Table by AGNE (1989) (occurrence), and Kogyo Rea Metaru (Industrial Rare Metals), 107 (1993), 26 (price)].

The alloy according to the present invention, which has the characteristics as described above, is useful particularly as a material for storing and transporting hydrogen, for conserving heat, etc.

What is claimed is:

1. Ca—Al system hydrogen absorbing alloy consisting essentially of a mixture P of Ca with Mg represented by the general formula, $(1-\alpha)Ca+\alpha Mg$ (providing $0 \leq \alpha \leq 0.2$) and an Al base alloy Q represented by the general formula, $Al_{1-\beta}B_\beta$ (providing $0 \leq \beta \leq 0.3$), wherein the element M means at least one element selected from the group consisting of carbon, silicon, germanium, tin, lead, titanium, vanadium, chromium, manganese, iron, cobalt, nickel, copper and zinc and which has a molar ratio of P:Q=1:1.5 to 2.8 and a fundamental structure of a Laves phase with C15 structure.

* * * * *